(12) United States Patent
She

(10) Patent No.: US 7,512,230 B2
(45) Date of Patent: Mar. 31, 2009

(54) METHOD AND APPARATUS OF FAST MODULAR REDUCTION

(76) Inventor: Alfred C. She, 8540 SW. Wakkila Ter., Beaverton, OR (US) 97007

( * ) Notice: Subject to any disclaimer, the term of this patent is extended or adjusted under 35 U.S.C. 154(b) by 745 days.

(21) Appl. No.: 10/136,662

(22) Filed: Apr. 30, 2002

(65) Prior Publication Data

US 2003/0202657 A1   Oct. 30, 2003

(51) Int. Cl.
*H04L 29/00* (2006.01)

(52) U.S. Cl. ......................................... 380/28; 380/30

(58) Field of Classification Search .................. 380/28, 380/30
See application file for complete search history.

(56) References Cited

U.S. PATENT DOCUMENTS 4,994,994 A * 2/1991 Burgess et al. .............. 708/491
5,101,431 A * 3/1992 Even ........................... 380/30
5,121,429 A * 6/1992 Guppy et al. ................. 380/30
5,742,530 A * 4/1998 Gressel et al. ............. 708/491
6,317,769 B1 * 11/2001 Kobayashi et al. ......... 708/491

OTHER PUBLICATIONS

Bruce Schneier, Applied Cryptography, Second Edition.*
Comparison of three modular reduction functions, Bosselaers et al, Oct. 25, 1993.*
A Fast Algorithm for Modular Reduction, Koc et al, Jul. 1998.*
Taras Shevchenko University Kibernetika I Sistemnyi Analiz, Apr. 26, 1999.*

* cited by examiner

*Primary Examiner*—Andrew L Nalven

(57) ABSTRACT

Methods and apparatus reduce the computational load for computing r=x mod n, given two numbers x and n, where x is 2t bits long and n is t bits long. Such reduced computational loading in modular reduction schemes is useful for, at least, network communication systems that include modular reduction in cryptography, particularly, public key encryption algorithms such as RSA, El Gamal, Rabin, and Diffie-Hellman.

19 Claims, 4 Drawing Sheets

METHOD AND APPARATUS OF FAST MODULAR REDUCTION

BACKGROUND OF THE INVENTION

1. Field of the Invention

The present invention relates generally to the field of computation, and more particularly relates to methods and apparatus for computation useful for high-speed networking and communication systems.

2. Background Information

With advances in integrated circuit, microprocessor, networking and communication technologies, an increasing number of devices, in particular, digital computing devices, are being networked together. Such devices are often first coupled to a local area network, such as an Ethernet based office/home network. In turn, the local area networks are interconnected together through wide area networks, such as Synchronous Optical Networks (SONET), Asynchronous Transfer Mode (ATM) networks, Frame Relays, and the like. Of particular importance is the TCP/IP based global inter-network, the Internet. The rapid growth of the Internet has fueled a convergence of data communication (datacom) and telecommunication (telecom) protocols and requirements. It is increasingly important that data traffic be carried efficiently across local, regional and wide area networks.

As a result of this trend of increased connectivity, an increasing number of applications that are network dependent are being deployed. Examples of these network dependent applications include, but are not limited to, the World Wide Web, email, Internet based telephony, and various types of e-commerce and enterprise applications. The success of many content/service providers as well as commerce sites depends on high-speed delivery of a large volume of data across wide areas. In turn, this trend leads to an increased demand for high-speed data trafficking equipment, such as high-speed optical-electrical routers or switches and so forth. In other words, as a widening variety of new and traditional services converge across shared inter-networking transport structures, there is a critical need for the Internet to simultaneously deliver higher bandwidths, more reliable service and greater deployment flexibility. One solution for these converging services, such as that provided by Network Elements, Inc., of Beaverton, Or., is to provide highly configurable optical networking modules for efficiently interconnecting high-performance routing/switching systems in the high-speed optics-based, multi-protocol Internet infrastructure.

However, even with the advent of highly configurable optical networking modules for efficiently interconnecting high-performance routing/switching systems in the high-speed optics-based, multi-protocol Internet infrastructure, the demands for greater throughput in the future dictate that additional methods and apparatus be developed for providing greater throughput, functionality, and reliability while reducing the complexity and power consumption of such equipment. One of the functions currently handled by such networking equipment in the performance of their tasks is that of multi-precision integer division. Multi-precision integer division, and similarly, multi-precision modular reduction are commonly considered to be amongst the most computationally expensive of the so-called basic multi-precision integer operations. These functions are often used during common communication system operations such as encryption and/or decryption. In particular, communication systems often include modular reduction in public key encryption algorithms such as RSA, El Gamal, Rabin, and Diffie-Hellman.

What is needed are methods and apparatus for providing greater throughput, functionality, and reliability for networking devices and equipment while reducing the complexity and power consumption.

SUMMARY OF THE INVENTION

Briefly, methods and apparatus are provided in accordance with the present invention in which the computational complexity associated with achieving multi-precision modular reduction is reduced. More particularly, embodiments of the present invention include one or more means for computing modular reduction using multi-precision additions and 1-bit left shifts. The number of multi-precision additions and shifts is linear in the number of bits of the modulus.

In some embodiments of the present invention, methods and apparatus reduce the computational load for computing $r = x \bmod n$, given two numbers x and n, where x is 2t bits long and n is t bits long. Such reduced computational loading in modular reduction schemes is useful for, at least, network communication systems that include modular reduction in cryptography, particularly, public key encryption algorithms such as RSA, El Gamal, Rabin, and Diffie-Hellman.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Reference herein to "one embodiment", "an embodiment", or similar formulations, means that a particular feature, structure, or characteristic described in connection with the embodiment, is included in at least one embodiment of the present invention. Thus, the appearances of such phrases or formulations herein are not necessarily all referring to the same embodiment. Furthermore, various particular features, structures, or characteristics may be combined in any suitable manner in one or more embodiments.

Embodiments of the present invention provide computationally efficient methods and apparatus for modular reduction, an operation that is useful in, among other things, several public key algorithms for key agreement (e.g., Diffie-Hellman, El Gamal), digital signatures (e.g., DSS, RSA, Rabin), and encryption/decrytption (e.g., RSA, Rabin).

As mentioned above, the trend toward increased connectivity, and an increased number of network dependent applications has created demand for improved data throughput in networks. It is well known that many computational activities take place in order to move content from one device to another over a network. This is particularly true, when complex schemes for encryption/decryption, compression/decompression, encapsulation, routing, and so on, are used. Such computational activities may include multi-precision integer division and multi-precision modular reduction. By reducing the complexity of such computational activities, embodiments of the present invention may advantageously process more network data traffic per unit of time than conventionally implemented network equipment and/or network processes.

Figure 1:
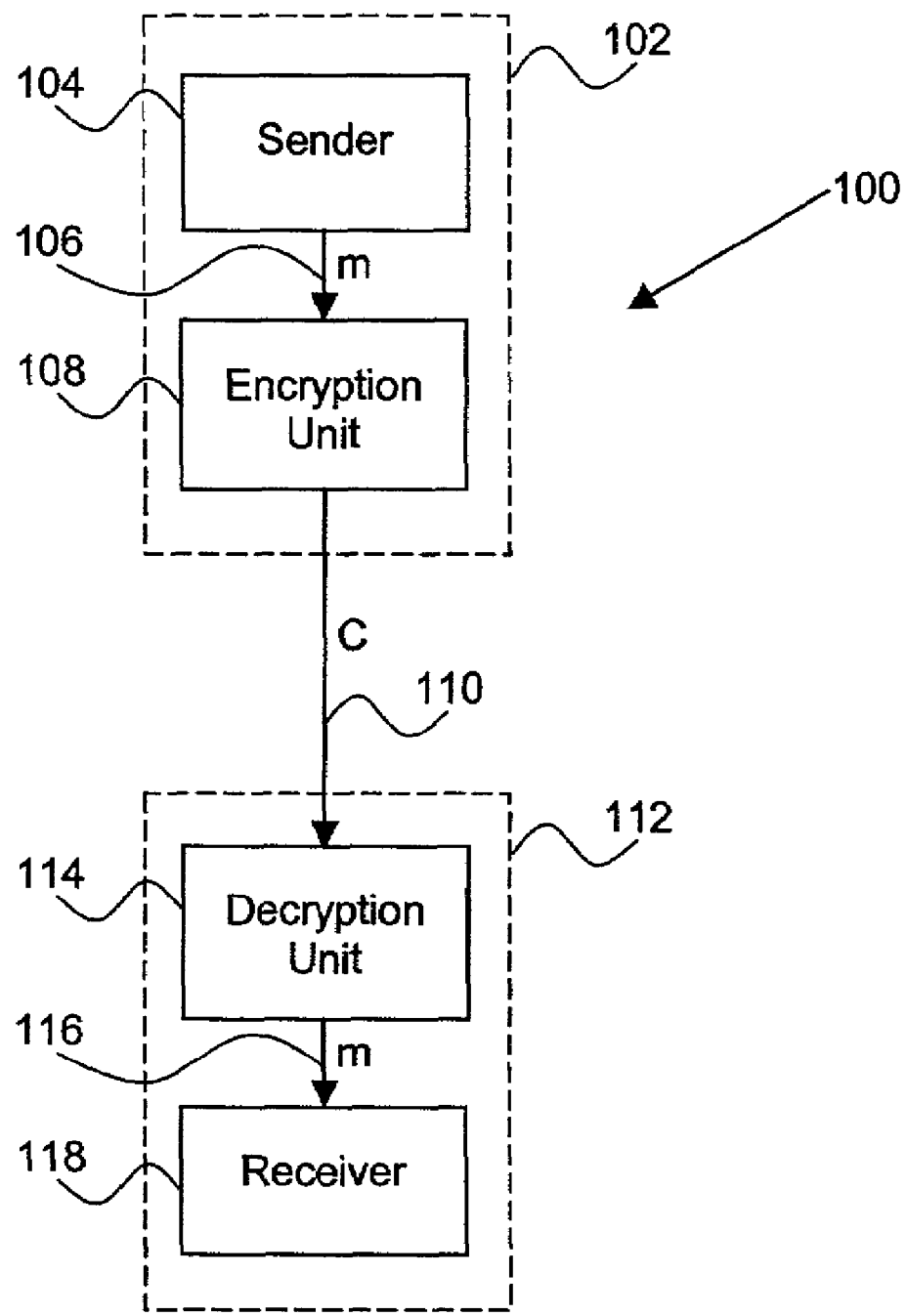
FIG. 1 is a block diagram showing a generalized communications system having a transmitting unit and a receiving unit in accordance with the prior art.

FIG. 1 is a block diagram showing a generalized communications system 100 having a transmitting unit 102 and a receiving unit 112. Transmitting unit 102 includes a sender unit 104 that produces, as an output, a plaintext message m on a communications pathway 106; and further includes an encryption unit 108. Communications pathway 106 couples sender unit 104 with encryption unit 108. Encryption unit 108 produces, as an output, a ciphertext message c on a public channel 110.

Public channel 110 couples transmitting unit 102 with receiving unit 112. Receiving unit 112 includes a decryption unit 114 that produces, as an output, the plaintext message m on a communications pathway 116; and further includes a receiver unit 118. Communications pathway 116 couples decryption unit 114 to receiver unit 118.

When in use, the generalized communications system of FIG. 1 produces a plaintext message which is then encrypted, sent out over the public channel to a destination where the encrypted message, i.e., the ciphertext, is decrypted and then passed to a receiver. The block diagram shown in FIG. 1 represents a conventional network communications system. Modular reduction computations which may be performed in such a system typically use multi-precision integer operations which are computationally intensive.

Figure 2:
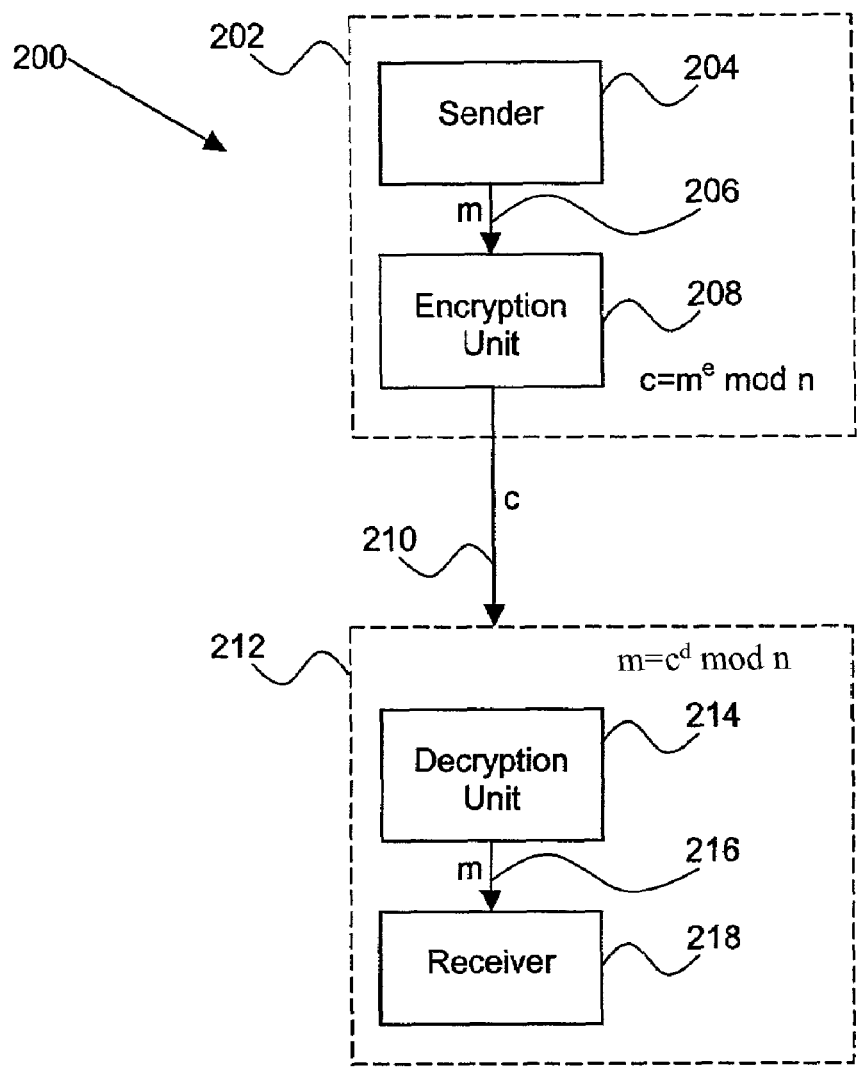
FIG. 2 is a block diagram showing a communications system having a transmitting unit and a receiving unit in accordance with the present invention.

FIG. 2 is a block diagram showing an illustrative communications system in accordance with the present invention. In this illustrative communications system a message sent between a source and destination may be encrypted and decrypted in accordance with a public key encryption algorithm such as the RSA public key encryption algorithm. The present invention provides improved computational efficiency as compared to conventional systems. With respect to the illustrative system of FIG. 2, it is noted that the present invention is not limited to use with the RSA encryption/decryption algorithm, but rather is applicable generally to any algorithm that includes the "mod" operation for encryption, decryption, or both. Some known algorithms used, for example in communications, require modular reductions for both encryption and decryption, some only for encryption, some only for decryption, and some such algorithms do not use modular reduction. Again, embodiments of the present invention advantageously provide improved computational efficiency in performing the modular reduction.

Still referring to FIG. 2, a communications system 200 is shown having a transmitting unit 202 coupled to a receiving unit 212 by way of a public channel 210. Transmitting unit 202 includes a sender unit 204 that produces, as an output, a plaintext message m on a communications pathway 206; and further includes an encryption unit 208. Communications pathway 206 couples sender unit 204 with encryption unit 208. Encryption unit 208 produces, as an output, a ciphertext message c on public channel 210. Ciphertext message c is produced in accordance with the relationship $c=m^e$ mod n.

Still referring to FIG. 2, ciphertext message c is delivered to receiving unit 212 via communications pathway 210. Receiving unit 212 includes a decryption unit 214 that produces, as an output, plaintext message m on a communications pathway 216. Decryption unit 214 produces, as an output, plaintext message m in accordance with the relationship $m=c^d$ mod n. Communications pathway 216 couples decryption unit 214 to receiver unit 218.

It should be noted that the various blocks of communications system 200 may be implemented in hardware, or by means of software that is executed by a stored program machine, such as a computer, or by a combination of specialized hardware, and software executed by a computer. For example, encryption unit 208 may be implemented as a software module, or process, that is part of a communications stack in a larger communications program. Alternatively, encryption unit 208 may be implemented as customized hardware such as might be found for example, in an Application Specific Integrated Circuit (ASIC) or any type of integrated circuit or circuits. Similarly, communications pathway 206 may be implemented as any suitable means of transferring data whether wired, wireless, or a combination or wired and wireless. In this context, wired includes any physical communications medium, such as but not limited to, fiber optic cable, electrical conductors, wave guides, and so on. Communications pathway 206 may be formed by means such as, for example, a serial or a parallel bus, with or without intervening buffer circuitry. Such intervening buffer circuitry may or may not include intermediate memory storage.

As can be seen, both encryption unit 208 and decryption unit 214 perform a function, or computation, that includes one of the general form $r=x$ mod n. Multi-precision integer division, and similarly, multi-precision modular reduction, are some of the most computationally expensive of the so-called basic multi-precision integer operations. Embodiments of the present invention provide methods and apparatus useful for, at least, reducing the amount of computational effort required to perform modular reduction. Modular reduction is closely related to integer division. Various embodiments of the present invention provide methods and apparatus for computing modular reduction that include multi-precision additions, multi-precision subtractions, and 1-bit left shifts. The number of multi-precision additions, multi-precision subtractions, and shifts is linear in the number of bits of the modulus.

In at least the particular class of computational problems such as the illustrative encryption/decryption described above, it is desired to reduce the amount of computation required to compute $r=x$ mod n where n is t bits long, and x is 2t bits long. As will be appreciated by those skilled in the art having the benefit of this disclosure, reducing computation can result in (1) achieving a result more quickly, thus effectively increasing throughput; and (2) allowing a result to be achieved with less hardware, thus lowering costs and power consumption, while increasing reliability; and various combinations of (1) and (2).

By definition, the binary representation of x, that is, $x=[x_{(2t-1)}x_{(2t-2)} \ldots x_1 x_0]_2$, explicitly lists the powers of two that, when summed yield the value of x. Using this definition, and the fact that (a+b) mod n=[(a mod n)+(b mod n)] mod n; x mod n can be computed by computing powers of two modulo n, and then summing the residues which correspond to each bit of x that equals one.

In a further aspect of the present invention, an efficient algorithm for computing powers of two modulo n is provided. A general strategy in accordance with the present invention is to compute $2^i$ mod n for i=t to (2t−1). These values can either be pre-computed and stored, or computed on the fly just in time for use in the modular reduction calculation. For any particular implementation of the present invention, the cost of pre-computation in terms of memory storage requirements should be traded-off with the improvements in speed. No particular speed versus memory requirement trade-off is preferred in general, as this must be decided on a case-by-case basis in terms of the desired price/performance characteristics of a specific implementation.

Where $x = [x_{(2t-1)}x_{(2t-2)} \ldots x_1 x_0]_2$ the equations immediately below define variables, and indicate how to break up the representation of a number (x, in this case) so that the algorithm (shown further below) can be applied for efficient modulo reduction.

$$x = \sum_{i=0}^{2t-1} x_i 2^i = \sum_{i=0}^{t-1} x_i 2^i + \sum_{i=t}^{2t-1} x_i 2^i, \text{ so}$$

$$x \bmod n = \left[\sum_{i=0}^{t-1} x_i 2^i + \sum_{i=t}^{2t-1} x_i 2^i\right] \bmod n$$

$$= \left[\left(\sum_{i=0}^{t-1} x_i 2^i\right) \bmod n + \left(\sum_{i=t}^{2t-1} x_i 2^i\right) \bmod n\right] \bmod n$$

$$= \left[x_L \bmod n + \sum_{i=t}^{2t-1} x_i (2^i \bmod n)\right] \bmod n$$

Additionally, the following equation represents a fact also used in the algorithm shown below.

$$2^{i+1} \bmod n = (2 \cdot 2^i) \bmod n = 2(2^i \bmod n)$$

Such an algorithm in accordance with the present invention may include computing $p_i = 2^i \bmod n$ for $i \in [t, 2t-1]$. In this manner, $$r = x_L + \sum_{i=t}^{2t-1} x_i p_i$$

where $x_L$ denotes the least significant t bits of x. The need to store all $p_i$ in a look-up table may be eliminated by computing $p_i$ on the fly using a procedure such as, for example, the following procedure:

```
1) r = x_L
2) p = 2^t; if (p > n), p = p−n
3) Let i = t                //i is the loop index
4) If i ≥ 2t, go to step 9  //loop exit condition
5) If x_i = 1, r = r + p    //Accumulate power of 2 residues for bits
                              of x that are set
6) p = 2p                    //Compute next power of two
7) If (p > n), p = p − n     //Reduce power of two modulo n
8) i = i + 1; Go to step 4   //Increment loop index and repeat loop
9) While (r > n), r = r − n  //Final reduction(s) of r, if necessary
```

It is noted that if n is re-used, such as when multiple messages are encrypted or decrypted using the same modulus n, and if computational speed is more important in a particular implementation than is minimizing memory space, then storing p[i] in a look-up table can replace steps (6) and (7) of the algorithm above with a table look-up step. Such a table look-up step may be, but is not limited to, p=ptable[i], where ptable is a table of pre-computed $p_i$ that have each already been reduced modulo n.

Those portions of the algorithm above labelled (4) through (8) inclusive, can be computed in an iterative loop. That portion of the algorithm above labelled (7) requires one multi-precision subtraction, since n is t bits long. Because the operational step labeled (7) ensures that p is always less than or equal to 2n, and n is only t bits long, p can be stored in t+1 bits of memory. Additionally, r can be stored in $(t+\log_2(t))$ bits of memory. This means that, on average, operational step (9) can be computed using bit-wise long division that requires $\log_2(t)$ multi-precision subtractions. Whereas the worst case for the operational step labeled (9) is $\log_2(t)$ multi-precision subtractions. Operational steps (6) and (7) use the fact that $2^{(i+1)}$ mod $n = [2(2^i \bmod n)] = [2p_i]$ mod n. This implies that after computing $2^{(i+1)}$ mod n in operational step (2), all subsequent $p_i$ are computed simply by using a left shift (step 6) and at most one multi-precision subtraction (if p>n in step 7). It should be noted that operational step (5) can be executed, or performed, while operational steps (6) and (7) are busy executing, or performing, their functions of determining the next value of $p_i$. For a randomly selected n, the subtraction in operational step (7) will execute t/2 times on average, and since half of the bits of x will equal 1 on average, operational step (5) will execute t/2 times on average. It should be noted that the above method may be implemented by software that executes on a computer system, in which case, the variables described above are typically stored in memory locations within a memory subsystem of a computer. However, these variables may also be stored in one or more registers in a processor, such as for example, a microprocessor; or in one or more registers, or any suitable storage hardware configurations of an ASIC or other integrated circuit.

Still referring to the algorithm above, the total expected operation count is $t+\log_2(t)$ multi-precision subtractions, and t multi-precision shifts. The worst-case operation count is $2t+\log_2(t)$ multi-precision subtractions. For example, if t=1024, the worst-case total operation count is 2058 multi-precision subtractions, or a computational expense roughly equivalent to 65,856 single-precision subtractions on a 32-bit machine (e.g., a computer processor or microprocessor, or any suitable hardware computational resource architected to operate on 32-bit chunks of data).

Figure 3:
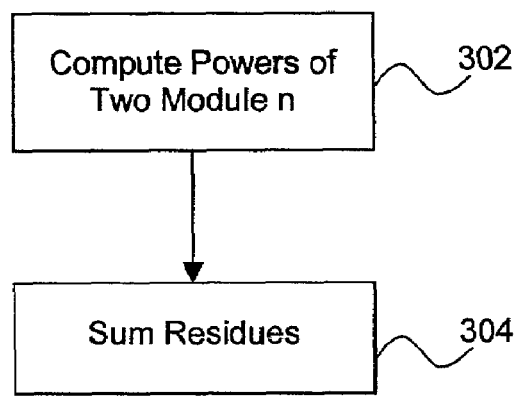
FIG. 3 is a flow chart illustrating a method of computing a modular reduction in accordance with the present invention.
Figure 4:
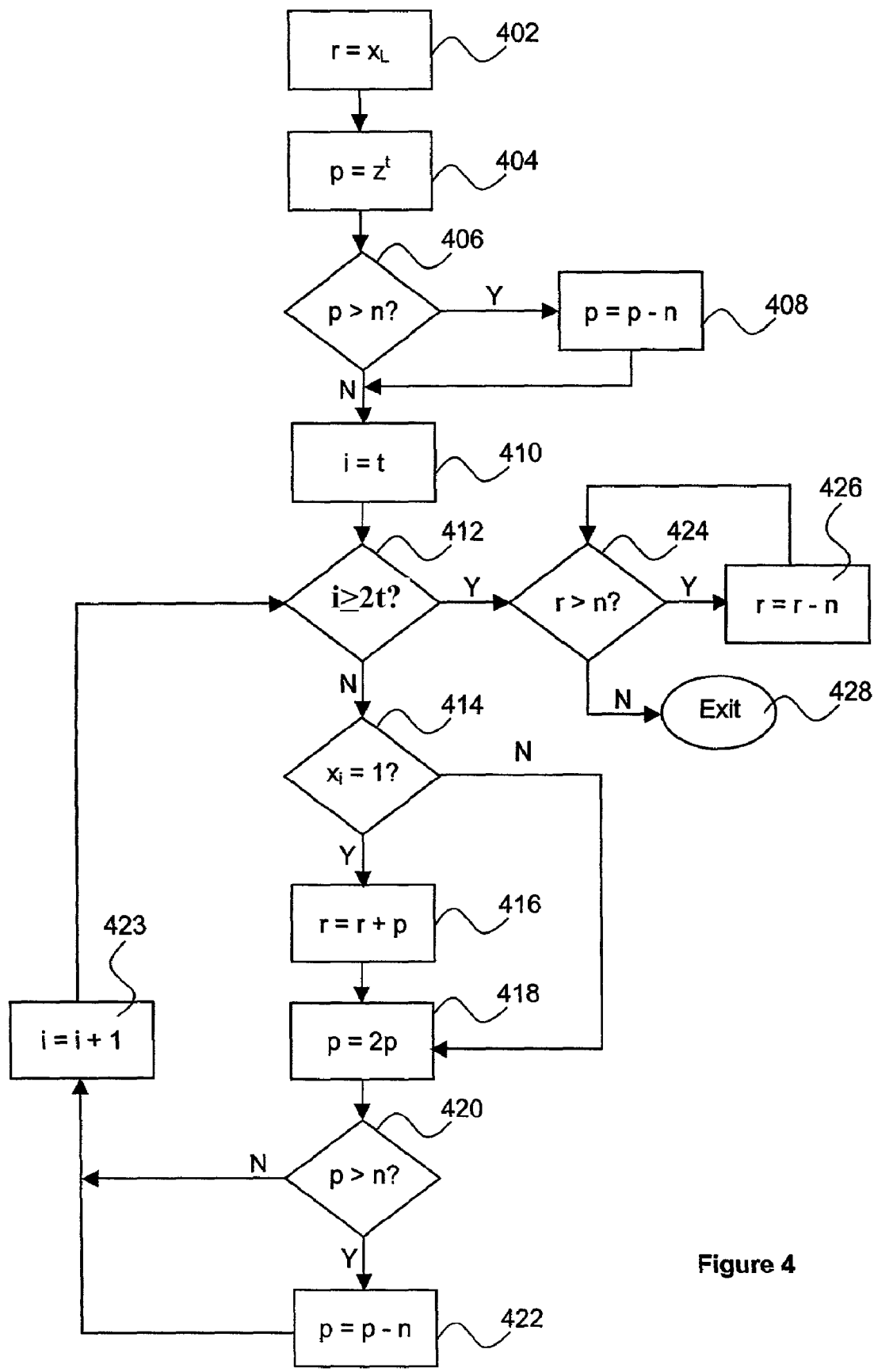
FIG. 4 is a flow chart illustrating a method of computing a modular reduction in accordance with the present invention.
Figure 5:
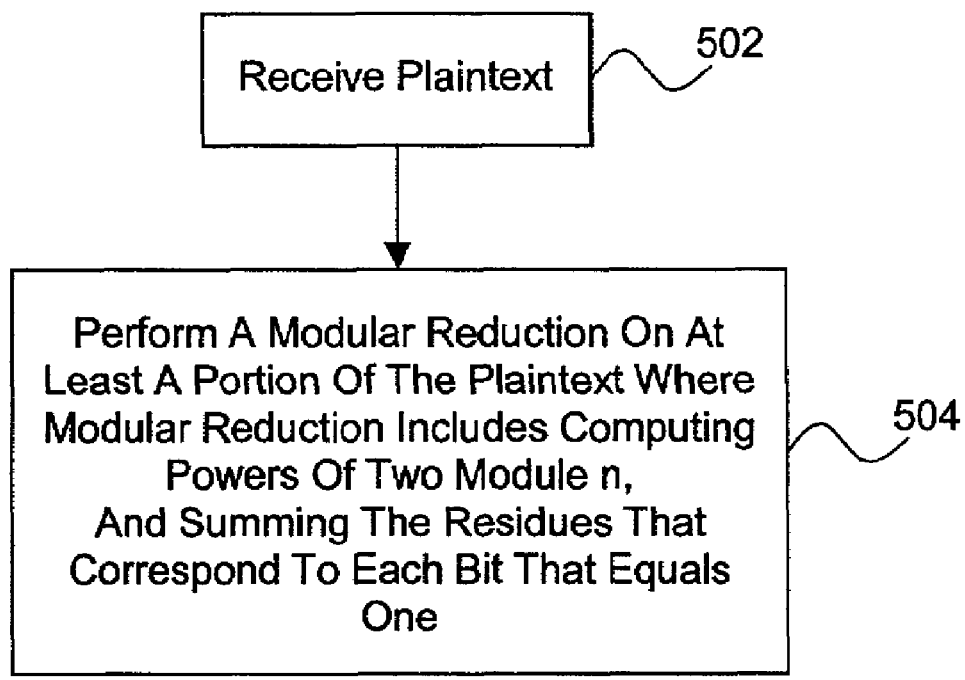
FIG. 5 is a flow chart illustrating a method of computing a modular reduction in accordance with the present invention.

FIGS. 3-5 are flow charts illustrating various embodiments of the present invention.

Referring to FIG. 3, an illustrative embodiment of the present invention is shown in which a fast modular reduction on a binary number X (where X is 2t bits long), is achieved by computing powers of two modulo n 302, and subsequently summing the residues 304 that correspond to each bit of X that equals one.

Referring to FIG. 4, an illustrative embodiment of the present invention shows details of a modular reduction algorithm. More particularly, a first variable r is set equal the value of $X_L$ 402. A second variable p, is set equal to the value of $2^t$, where t is the bit length of the number n 404. A determination is made 406 as to whether p is greater than n 406. If p is greater than n, then p is set equal to p−n 408, and control then passes to the operation shown at 410. If p is not greater than n, then control passes to the operation shown at 410. At 410 the loop index variable i is set equal to the value of t. A determination is then made 412 as to whether i is greater than or equal to 2t. If i is not greater than 2t, then a determination is made 414 as to whether $X_i$ is equal to 1. If $X_i$ is not equal to 1, then control passes to the operation at 418. If $X_i$ is equal to 1, then r is set equal to r+p and control passes to the operation at 418. At 418 p is set equal to 2p. A determination is then made 420 as to whether p is greater than n. If p is not greater than n, the loop control variable i is incremented at 423, then control passes to the operation at 412. If it is determined at step 420 that p is greater than n, then at 422, p is set equal to p−n, then the loop control variable i is incremented at 423 and subsequently control passes to the operation at 412. If the determination at 412 is that i is greater than or equal to 2t then a determination is made 424 as to whether r is greater than n. If r is greater than n, then r is set equal to r−n 426 and control passes to 424. If r is not greater than n, then the process terminates at 428. It is noted that the algorithm illustrated in FIG. 4 completes the computation of (r mod n) in steps 424 and 426 as a "while" loop, however, in alternative embodiments, (r mod n) can computed using bit-wise long division, or any other method that is mathematically equivalent.

Referring to FIG. 5, an illustrative embodiment of the present invention is shown in which a plaintext message is processed to produce an encrypted, or ciphertext, message using a fast modular reduction in accordance with the present invention. More particularly, a process receives plaintext 502. In this example the process is implemented as software being executed on a computer. It will be understood that such a process may be implemented in hardware alone, or as a combination of hardware and software. Using at least a portion of the plaintext as input, a modular reduction operation is performed 504 in which the modular reduction on the binary data representative of the input portion of the plaintext, is achieved by computing powers of two modulo n, and subsequently summing the residues that correspond to each bit of the input that equals one. Those skilled in the art, and having the benefit of the present disclosure, will recognize, that a decryption process, which includes a modular reduction operation, can be achieved in a similar manner. In other words, rather than receiving a plaintext message, a ciphertext message is received. In the decryption process a modular reduction is performed on at least a portion of the ciphertext in which the modular reduction on the binary data representative of that portion of the ciphertext, is achieved by computing powers of two modulo n, and subsequently summing the residues that correspond to each bit of the input that equals one.

In order to illustrate the advantages of embodiments of the present invention, a comparison is provided here to a conventional approach to modular reduction referred to as the Barrett modular reduction. Let k=t/w, where t is defined as in the example above, and w denotes the bit-length of a single-precision word. Then n is k words long. The Barrett modular reduction takes as input, positive integers $x=(x_{(2k-1)} \ldots x_1 x_0)_b$, $m=(m_{(k-1)} \ldots m_1 m_0)_b$ (with $m_{k-1} \neq 0$), and $\mu = \lfloor b^{2k}/m \rfloor$, and produces as output, r=x mod m. The Barrett modular reduction operation performs the following computational steps:

1. $q_1 \leftarrow \lfloor x/b^{k-1} \rfloor$, $q_2 \leftarrow q_1 \cdot \mu$, $q_3 \leftarrow \lfloor q_2/b^{k+1} \rfloor$ ∎
2. $r_1 \leftarrow x \bmod b^{k+1}$, $r_2 \leftarrow q_3 m \bmod b^{k+1}$, $r \leftarrow r_1 - r_2$
3. If r<0 then $r \leftarrow r + b^{k+1}$
4. While r≧m: do $r \leftarrow r - m$
5. Return (r)

The computational costs associated the steps of the Barrett modular reduction above are as follows:

0. Pre-compute $\lfloor b^{2k}/m \rfloor$. Using normalized division, this computation requires k(k+3) single precision multiplications and k single-precision divisions.
1. Step 1 takes ½(k²+5k+2) single-precision multiplications.
2. Step 2 takes ½(k²+3k) single-precision multiplications.
3. Step 3 takes at most 1 multiple-precision addition (i.e., k single-precision additions).
4. Step 4 takes at most 2 multiple-precision subtractions (2k single-precision subtractions).

Assuming a subtraction takes the same number of cycles as an addition, the worst-case single-precision operation counts for a Barrett modular reduction are presented below:

TABLE I

| Operation | Analytic Expression | Operation Count for t = 1024 |
|---|---|---|
| Division | k | 32 |
| Multiplication | 2k² + 7k + 1 | 2273 |
| Addition | 3 k | 96 |

Using the following conversion factors for comparing computational costs: 1 division=32 subtractions, and 1 multiplication=32 additions, then the Barrett modular reduction takes roughly the equivalent of 73,856 additions' worth of computation (not including shifts and carries) which is more computation than that required by embodiments of the present invention. Moreover, the Barrett modular reduction requires more complex logic due to its use of division and multiplication units.

Some advantages of various embodiments of the present invention include reduced complexity of implementation, including reduced or eliminated need for multi-precision multiplies and/or multi-precision divides. By reducing complexity, simpler hardware may be used. Simpler hardware generally provides advantages such as lower cost, greater reliability, and reduced power consumption. Alternatively, by reducing complexity, greater throughput can be achieved because less computational resources are required to achieve a desired result.

Conclusion

Thus, it can be seen from the above descriptions that methods and apparatus for modular reduction have been described.

Computationally efficient algorithms for modular reduction, such as those provided by the methods and apparatus of the present invention, are useful for applications such as public key algorithms for key agreement (e.g., Diffie-Hellman, El Gamal), digital signature schemes (e.g., DSS, RSA, Rabin), and encryption/decryption (e.g., RSA, Rabin).

The present invention may be implemented as circuit-based solutions, including possible implementation on a single integrated circuit. As would be apparent to one skilled in the art, various functions of circuit elements may also be implemented as processing operations in a software program. Such software may be employed in, for example, a digital signal processor, a micro-controller, a special-purpose computer, or a general-purpose computer.

The present invention can be embodied in the form of methods, and apparatus for practicing those methods. The present invention can also be embodied in the form of program code embodied in tangible media, such as punched cards, magnetic tape, floppy disks, hard disk drives, CD-ROMs, flash memory cards, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates in a manner analogous to hardwired logic circuits.

While the present invention has been described in terms of the above-described embodiments, those skilled in the art will recognize that the invention is not limited to the embodiments described. The present invention can be practiced with modification and alteration within the spirit and scope of the appended claims. Thus, the description herein is to be regarded as illustrative rather than restrictive with respect to the present invention.

What is claimed is:

1. A method of validating a digital signature based at least in part on a value of x mod n, the method comprising:
   determining powers of two modulo n, as $2^i$ mod n, to provide associated residues for all integers i greater than or equal to t and less than 2t, wherein n comprises a binary value t bits long, and x comprises a binary value 2t bits long, wherein t is greater than one;
   summing the residues associated with bits of x which equal one; and
   validating the digital signature based, at least in part, on said value of x mod n.

2. The method of claim 1, further comprising:
   storing the powers of two modulo n in a look-up table; and
   determining the value of x mod n by retrieving the powers of two modulo n from the look-up table.

3. A method of communicating a message from a source to a destination, comprising:
   forming a plaintext message as a binary value X at said source having bit positions $x_{m-1}, x_{m-2}, \ldots, x_1, x_0$;
   encrypting said plaintext message to produce a ciphertext message, wherein encrypting comprises performing a first modular reduction operation on at least a portion of the plaintext message; and
   transmitting said encrypted plaintext message to said destination, wherein
   performing said first modular reduction operation further comprises:
   1) setting a first variable r equal to a least significant t bits portion of X;
   2) setting a second variable p equal to $2^t$; and if the second variable is greater than a modulus n, then setting the second variable equal to the value of p minus n;
   3) setting a loop index i equal to t;
   4) if loop index i is greater than or equal to 2t, then performing the operation at step (9);
   5) If $x_i$ equals 1, then setting the first variable equal to the sum of the value of r and p;
   6) multiplying the second variable by two;
   7) if p>n, then setting p=p−n;
   8) incrementing the loop index and transferring control to the operation at step (4); and
   9) while r>n, setting r=r−n.

4. The method of claim 3, wherein the first variable r, the second variable p, and the loop index i, are associated with memory storage locations of a computer system.

5. The method of claim 3, wherein the first variable r, the second variable p, and the loop index i, are associated with memory storage locations in an application specific integrated circuit.

6. The method of claim 3, wherein said transmitting the encrypted plaintext message comprises transmitting said encrypted plaintext message to a receiver at said destination.

7. The method of claim 6, further comprising:
   decrypting the encrypted plaintext message received at said receiver to produce the plaintext message, wherein said decrypting comprises performing a second modular reduction operation on at least a portion of the received encrypted plaintext message,
   wherein said performing said second modular reduction operation comprises:
   1) setting a third variable equal to least significant t bits of the received encrypted message, the received encrypted message comprising a binary value XX having bit positions $xx_{k-1}, xx_{k-2}, \ldots, xx_1, xx_0$;
   2) setting a fourth variable equal to $2^t$; and if the fourth variable is greater than said modulus n, then setting the fourth variable equal to the value of the fourth variable minus the modulus n;
   3) setting a loop index j equal to t;
   4) if loop index j is greater than or equal to 2t, then performing the operation at step 9;
   5) If $xx_j$ equals 1, then selling the third variable equal to the value of the third variable plus the fourth variable;
   6) multiplying the fourth variable by two;
   7) if the fourth variable is greater than n, then selling the fourth variable to be the fourth variable minus n;
   8) selling j=j+1 and transferring control to the operation at step (4); and
   9) while r>n, setting r=r−n.

8. The method of claim 7, wherein the source and destination are coupled by a public channel.

9. The method of claim 8, wherein the public channel comprises a wired portion and buffer circuitry disposed between the source and destination.

10. A method of providing a plaintext message, comprising: receiving a ciphertext message in digital format; and
   decrypting the ciphertext message to produce a plaintext message comprising a binary value X having bit positions $x_{m-1}, x_{m-2}, \ldots, x_1, x_0$, wherein decrypting comprises performing a modular reduction operation on at least a portion of the ciphertext message; wherein performing a modular reduction comprises
   1) setting a first variable r equal to a least significant t bits portion of X;
   2) setting a second variable p equal to $2^t$; and if the second variable p is greater than a modulus n, then setting the second variable p equal to the value of the second variable p minus the modulus n;
   3) setting a loop index i equal to t;
   4) if loop index i is greater than or equal to 2t, ten performing the operation at step 9;
   5) If $x_i$ equals 1, then setting the first variable r equal to the value of the first variable r plus the second variable p;
   6) multiplying the second variable p by two;
   7) if p>n, then setting p=p−n;
   8) incrementing the loop index and transferring control to the operation at step (4); and
   9) while r>n, setting r=r−n.

11. The method of claim 10, wherein the ciphertext message is received from a public channel.

12. The method of claim 11, wherein the first variable, the second variable, and the loop index I, are associated with memory storage locations of a computer system, and said setting values comprises writing to respective memory storage locations associated with said values.

13. An article of manufacture, comprising:
a substrate from which instructions may be perceived for use by at least one computational resource; the instructions including:
encrypting a plaintext message to produce a ciphertext message in a digital format, said plaintext message comprising a binary value X having bit positions $x_{m-1}$, $x_{m-2}$, ..., $x_1$, $x_0$; wherein said encrypting comprises performing a modular reduction operation on at least a portion of the plaintext message wherein said performing said modular reduction operation comprises:
1) setting a first variable r equal to the least significant t bits of the portion of X;
2) setting a second variable p equal to $2^t$; and if the second variable is greater than a modulus n, then setting the second variable p equal to the value of the second variable p minus the modulus n;
3) setting a loop index I equal to t;
4) if loop index I is greater than or equal to 2t, then performing the operation at step (9);
5) If $x_i$ equals 1, then setting the first variable r equal to the value of the first variable r plus the second variable p;
6) multiplying the second variable p by two;
7) if p>n, then setting p=p−n;
8) incrementing the loop index and transferring control to the operation at step (4); and
9) while r>n, setting r=r−n.

14. A method for determining the value of x mod n for validating a digital signature, comprising:
determining powers of two modulo n, as $2^i$ mod n, to provide associated residues for all integers i greater than or equal to t and less than 2t, wherein n comprises a binary value t bits long, and x comprises a binary value 2t bits long, wherein t is greater than one;
while excluding the associated residues with bits of x which equal zero, summing the residues associated with bits of x which equal one; and
validating the digital signature based, at least in part, on the value of x mod n.

15. The method of claim 14, further comprising:
storing the powers of two modulo n in a look-up table; and
determining the value of x mod n by retrieving the powers of two modulo n from the look-up table.

16. The method of claim 15, wherein i is greater than or equal to t and less than 2t.

17. A computing device operated method for processing a digital document, comprising:
determining powers of two modulo n, as $2^i$ mod n, to provide associated residues for all integers i greater than or equal to t and less than 2t, wherein n comprises a binary value t bits long, and x comprises a binary value 2t bits long, wherein t is greater than one;
while excluding the associated residues with bits of x which equal zero, summing the residues associated with bits of x which equal one; and
processing the digital document based, at least in part, on the value of x mod n.

18. The method of claim 17, further comprising:
storing the powers of two modulo n in a look-up table; and
determining the value of x mod n by retrieving the powers of two modulo n from the look-up table.

19. A computing device comprising:
a storage medium configured to store a digital document, a look-up table having a plurality of values of 2i mod n for a plurality of integer values of i, and a plurality of instructions; and
a processor coupled with the storage medium to execute the instructions to:
determine powers of two modulo n, as 2i mod n, to provide associated residues for all integers i greater than or equal to t and less than 2t, wherein n comprises a binary value t bits long, and x comprises a binary value 2t bits long, wherein t is greater than one;
sum the residues associated with bits of x which equal one, while excluding the associated residues with bits of x which equal zero; and
process the digital document based, at least in part, on the value of x mod n.

* * * * *

UNITED STATES PATENT AND TRADEMARK OFFICE
CERTIFICATE OF CORRECTION

PATENT NO.        : 7,512,230 B2  
APPLICATION NO.   : 10/136662  
DATED             : March 31, 2009  
INVENTOR(S)       : She et al.

Page 1 of 1

It is certified that error appears in the above-identified patent and that said Letters Patent is hereby corrected as shown below:

Column 10, line 30, "then selling the third" should read --then setting the third--  
Column 10, line 33, "then selling the fourth" should read --then setting the fourth--  
Column 10, line 35, "8) selling j=j+1" should read --8) setting j=j+1--  
Column 10, line 58, "to 2t, ten performing" should read --to 2t, then performing--  
Column 12, line 27, "of values 2i mod n" should read --of values $2^i$ mod n--  
Column 12, line 32, "as 2i mod n, to" should read --as $2^i$ mod n, to--

Signed and Sealed this  
Twenty-fourth Day of May, 2011

David J. Kappos  
*Director of the United States Patent and Trademark Office*